June 23, 1970  W. E. DOUGHERTY  3,516,475
MOLDING METHOD AND APPARATUS
Filed Nov. 14, 1966  11 Sheets-Sheet 4

June 23, 1970 W. E. DOUGHERTY 3,516,475
MOLDING METHOD AND APPARATUS
Filed Nov. 14, 1966 11 Sheets-Sheet 7

June 23, 1970  W. E. DOUGHERTY  3,516,475
MOLDING METHOD AND APPARATUS

Filed Nov. 14, 1966  11 Sheets-Sheet 11

United States Patent Office 3,516,475
Patented June 23, 1970

3,516,475
MOLDING METHOD AND APPARATUS
William E. Dougherty, Pittsburgh, Pa., assignor to Herman Pneumatic Machine Company, Pittsburgh, Pa., a corporation of Pennsylvania
Filed Nov. 14, 1966, Ser. No. 594,086
Int. Cl. B22c 15/00
U.S. Cl. 164—37                                         18 Claims

ABSTRACT OF THE DISCLOSURE

A molding method comprising forming a cope mold in a first slip flask having a pattern therein, drawing said pattern, forming a drag mold in a second slip flask having a pattern therein, drawing said second mentioned pattern, inverting the second slip flask with the drag mold therein, supporting the drag mold and removing the second slip flask therefrom, placing the cope mold on the drag mold and removing the first slip flask from the cope mold. Preferably the drag mold is formed at a first station and the second slip flask with the drag mild may be shifted to a second station and at the second station the drag mold may be supported and the second slip flask removed therefrom.

Also molding apparatus comprising a first slip flask and pattern for forming a cope mold, a second slip flask and pattern for forming a drag mold, means for introducing mold forming material into the flasks upon the patterns, means for compacting the introduced mold forming material to form cope and drag molds, means for drawing the patterns, means for inverting the second slip flask with the drag mold therein, means for supporting the drag mold and removing the second slip flask therefrom, means for placing the cope mold on the drag mold and means for removing the first slip flask from the cope mold. One station may be provided at which the molds are formed and another station may be provided at which the cope mold is placed on the drag mold, and transfer means may be provided for transferring the molds between the stations. The cope mold may be formed in the first slip flask and the drag mold in the second slip flask at a common station. Cope molds and drag molds may be formed alternately at the common station.

---

This invention relates to foundry practice and particularly to an improved molding method and apparatus. My molding method and apparatus are employed in the forming and assembling for casting of mold parts of finely divided mold forming material which I shall call "sand"; those skilled in the art know that molding or foundry "sand" is specially prepared and may contain graphite and other ingredients to insure adequate packing as the mold part is formed and retention of form during casting.

As well known to those skilled in the art, sand mold parts known as copes and drags or cope molds and drag molds are formed and after formation a cope and drag are assembled to form a complete mold and molten metal is poured into the mold to form a casting. Each cope and each drag is formed by introducing sand into a flask upon a pattern, consolidating or compressing the sand against the pattern and stripping the flask with the formed cope or drag therein from the pattern. The drag is inverted and the cope with a pouring basin and sprue formed therein is set atop the drag and molten metal is poured into the mold through the sprue.

A common practice is to maintain the flasks about the cope and drag to reinforce the cope and drag until after the casting has been poured and has solidified and to then separate the flasks and knock out the casting, at the same time breaking up the sand mold. However, this practice would require the provision of a very large number of flasks in a large foundry turning out many thousands of identical castings, such as engine blocks in an automobile engine manufacturing plant. It has heretofore been proposed in hand work foundries as distinguished from automated foundries to remove the flasks from the copes and drags after formation of the copes and drags but before casting, making the flasks immediately available for the froming of further molds and consequently greatly reducing the number of flasks required. However, such practice is inefficient, particularly when large and heavy castings are being formed.

The practice of removing the flasks from the mold parts before casting may be called a system to produce flaskless molds. The great economic advantages of such a system have long been recognized. However, despite the advances in mechanization and automation in recent years no feasible method or apparatus for the automated production of flaskless molds has been developed. The problems involved in precise handling and relative movement and manipulation of the cope and drag flasks and other elements of the apparatus have not been solved prior to my present invention. Although the ultimate object is flaskless casting that object must be attained in the formation and handling of the cope and drag, i.e., in molding.

I have developed a successful molding method and apparatus for the production of flaskless molds by a novel approach to the problems of manipulation of the apparatus elements employed and performance of the related method steps. I employ slip flasks, i.e., flasks having retractable elements adapting the flasks to be easily and with precision separated or removed from the mold parts formed therein.

In the performance of my novel molding method I form a cope mold in a first slip flask having a pattern therein, draw the pattern, form a drag mold in a second slip flask having a pattern therein, draw the pattern, invert the second slip flask with the drag mold therein, support the drag mold, remove the second slip flask from the supported drag mold, place the cope mold atop the drag mold and remove the first slip flask from the cope mold. I preferably form the drag mold in the second slip flask at a first station, shift the second slip flask with the drag mold therein to a second station and at the second station support the drag mold, remove the second slip flask therefrom, place the cope mold atop the drag mold and remove the first slip flask from the cope mold. I may dispose the cope mold in the first slip flask above the drag mold, relatively move the cope mold in the first slip flask and the drag mold generally vertically until the cope mold seats on the drag mold and remove the first slip flask from the cope mold. Desirably, however, I dispose the cope mold in the first slip flask above the drag mold, raise the drag mold until the cope mold seats on the drag mold, release the first slip flask from the cope mold and lower the drag mold with the cope mold seated thereon until the cope mold is clear of the first slip flask.

More specifically, my molding method may comprise forming successively at a common molding station a cope mold in a first slip flask having a pattern therein and a drag mold in a second slip flask having a pattern therein, drawing the patterns from the flasks, inverting the second slip flask with the drag mold therein, supporting the drag mold and removing the second slip flask therefrom, disposing the cope mold in the first slip flask above the drag mold at an assembling station, relatively moving the cope mold in the first slip flask and the drag mold generally vertically at the assembling station until the cope mold seats on the drag mold and removing the first slip flask from the cope mold. My molding method in its preferred practice comprises forming alternately at a common molding station cope molds in first slip flasks having patterns therein and drag molds in second slip flasks having patterns therein, drawing the patterns from the flasks, inverting the second slip flasks with the drag molds therein, supporting the drag molds and removing the second slip flasks therefrom, disposing cope molds in first slip flasks above the supported drag molds successively at an assembling station, relatively moving each such cope mold in a first slip flask and drag mold generally vertically at the assembling station until the cope mold seats on the drag mold, releasing the first slip flask from the cope mold and relatively moving the assembled molds and the first slip flask generally vertically until the cope mold is clear of the first slip flask.

Still more specifically, I may deliver the slip flasks with the cope and drag molds respectively therein in opposite directions from the molding station, the first slip flasks with the cope molds therein in one direction and the second slip flasks with the drag molds therein in the opposite direction, and finally deliver the first slip flasks with the cope molds therein successively to the assembling station and deliver the drag molds successively to the assembling station below the first slip flasks with the cope molds therein.

I cut a sprue in the cope mold when it is above the drag mold and intercept the cuttings so that they do not fall on the drag mold. I preferably dispose a shield generally above the drag mold and below the cope mold during cutting of the sprue in the cope mold to intercept the cuttings so that they do not fall on the drag mold and after cutting of the sprue in the cope mold remove the shield.

I provide molding apparatus comprising a first slip flask and pattern for forming a cope mold, a second slip flask and pattern for forming a drag mold, means for introducing mold forming material into the flasks upon the patterns, means for compacting the introduced mold forming material to form cope and drag molds, means for drawing the patterns, means for inverting the second slip flask with the drag mold therein, means for supporting the drag mold and removing the second slip flask therefrom, means for placing the cope mold on the drag mold and means for removing the first slip flask from the cope mold. Desirably one station is provided at which the molds are formed and another station is provided at which the cope mold is placed on the drag mold and transfer means are provided for transferring the molds between the stations. At the molding station the cope mold is formed in the first slip flask and the drag mold is formed in the second slip flask. In a continuous operation it is desirable to form alternately at the molding station cope molds in first slip flasks and drag molds in second slip flasks. Transfer means may be constructed and arranged to transfer the molds from the common molding station in opposite directions, the cope molds in one direction and the drag molds in the opposite direction.

I provide means for disposing the first slip flask with the cope mold therein above the drag mold together with means for relatively moving the first slip flask with the cope mold therein and the drag mold generally vertically, preferably for elevating the drag mold, until the cope mold seats on the drag mold and means for removing the first slip flask from the cope mold. Also means, preferably mounted on a fixed base, may be provided for releasing the first slip flask from the cope mold together with means for relatively moving the assembled molds and the first slip flask generally vertically, preferably for lowering the assembled molds, until the cope mold is clear of the first slip flask.

More specifically, I provide molding apparatus comprising means for forming alternately at a common molding station cope molds in first slip flasks having patterns therein and drag molds in second slip flasks having patterns therein, means for drawing the patterns from the slip flasks, means for delivering the slip flasks with the cope and drag molds respectively therein in opposite directions from the molding station, the first slip flasks with the cope molds therein in one direction and the second slip flasks with the drag molds therein in the opposite direction, means for inverting the second slip flasks with the drag molds therein, means for supporting the drag molds and removing the second slip flasks therefrom, means for delivering the first slip flasks with the cope molds therein successively to an assembling station, means for delivering the drag molds successively to the assembling station below the first slip flasks with the cope molds therein and means at the assembling station relatively moving each such cope mold in a first slip flask and drag mold generally vertically until the cope mold seats on the drag mold, releasing the first slip flask from the cope mold and relatively moving the assembled molds and the first slip flask generally vertically until the cope mold is clear of the first slip flask. Means are provided for moving the slip flasks to the common molding station together with means for closing the slip flasks as they move to the common molding station. The means for closing the slip flasks may be stationary means engaging portions of the slip flasks as the slip flasks move to the common molding station.

I further provide molding apparatus comprising a fixture, a plurality of flask parts mounted in the fixture for relative movement between closed or molding position and open or mold clearing position, the fixture having means for accurately positioning the flask parts in closed or molding position, and means for relatively moving the flask parts between said positions. The fixture desirably has accurately positioned locating means for cooperation with locating devices on base means on which the molding apparatus is adapted to be mounted in accurately predetermined position. Such locating means may be bushings for receiving locating pins on the base means. The means for relatively moving the flask parts between closed and open positions preferably are mounted on the fixture and have portions operatively connected with the flask parts.

Reciprocable means may be mounted on the fixture with connections to the flask parts constructed and arranged to move the flask parts into closed or molding position when the reciprocable means move in one direction and to move the flask parts into open or mold clearing position when the reciprocable means move in the opposite direction. A cylinder may be mounted on the fixture with a piston reciprocable therein and piston rods connected with the piston extending out of both ends of the cylinder, the piston rods having projections operating against inclined surfaces on or in inclined slots in the flask parts so that the flask parts are moved into closed or molding position when the piston moves in one direction in the cylinder and the flask parts are moved into open or mold clearing position when the piston moves in the opposite direction in the cylinder. The means for relatively moving the flask parts between closed and open positions may include eccentric means.

Other details, objects and advantages of the invention will become apparent as the following description of certain present preferred embodiments thereof and certain present preferred methods of practicing the same proceeds.

In the accompanying drawings I have shown certain present preferred embodiments of the invention and have illustrated certain present preferred methods of practicing the same, in which FIG. 1 is a perspective view of molding apparatus in accordance with my invention showing the molding station, the assembling station, the rollover station and a large part of the flask and mold handling mechanism, portions shown in other figures being omitted in FIG. 1 for clarity of showing of the portions illustrated (this manner of illustration is also employed in other figures);

Figure 15:
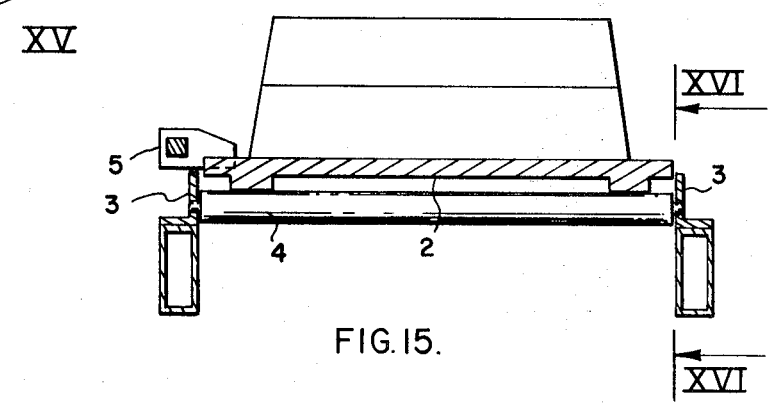
Figure 16:
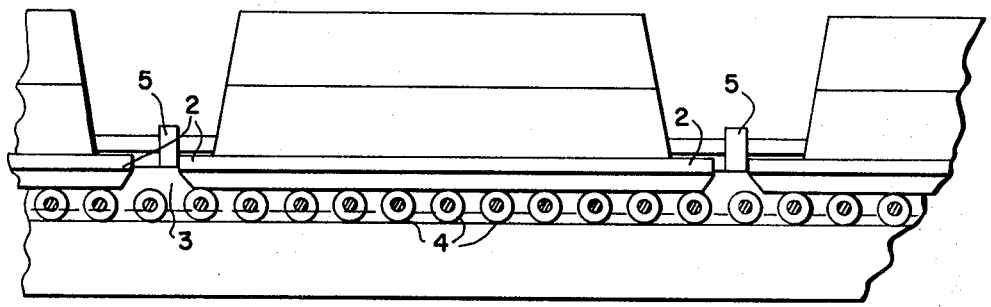

FIG. 15 is a vertical transverse cross-sectional view through a pallet carried on a roller conveyor and in turn carrying superposed cope and drag molds together with means for moving the pallet along the conveyor; and FIG. 16 is a fragmentary side elevational view of a roller conveyor carrying pallets each in turn carrying superposed cope and drag molds together with means for moving the pallets along the conveyor.

Figure 3:
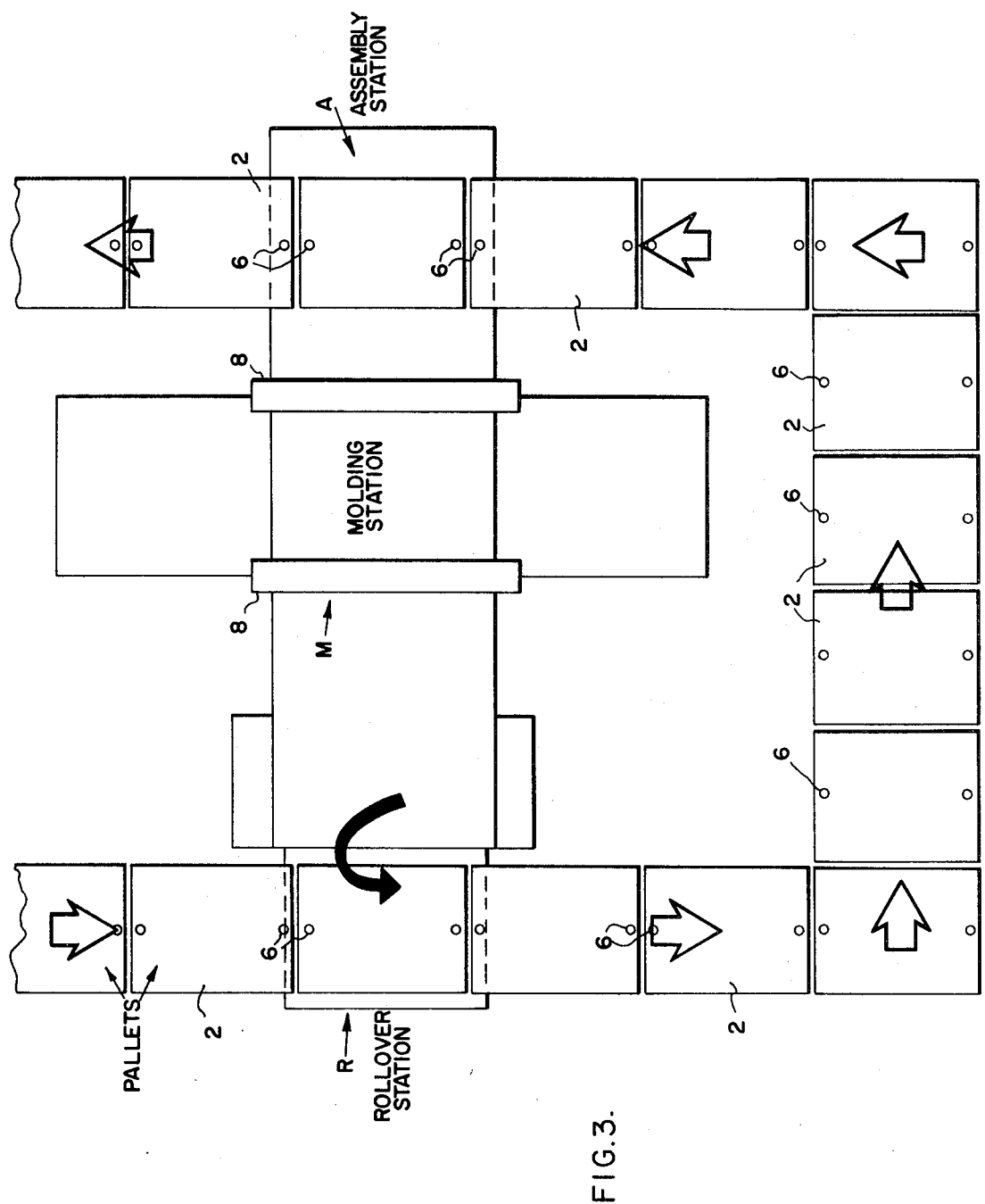
FIG. 3 is a diagram showing the paths of movement of the pallets carrying the cope and drag molds.
Figure 14:
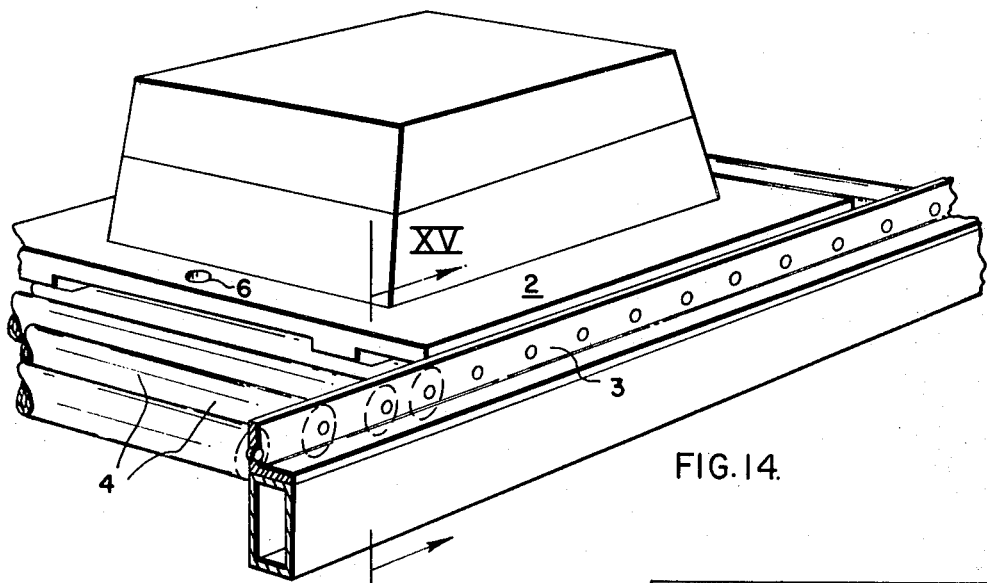
FIG. 14 is a fragmentary perspective view of superposed cope and drag molds on a pallet being carried on a roller conveyor.

Referring now more particularly to the drawings and first to FIG. 3, a series of pallets 2 are employed which are moved following one another in a generally U-shaped path designated by large arrow heads in FIG. 3. The pallets are suitably guided, as by rails or other means constituting guideways, the guideways forming two parallel paths as shown at the right- and left-hand sides of FIG. 3 and a transverse path at right angles to the parallel paths as shown at the bottom of the figure. The guideways may comprise opposed parallel side rails 3 as shown in FIGS. 14 and 15 with a series of rollers 4 rotatably carried by the side rails, the pallets being supported on the rollers and guided by the side rails. The pallets may be pushed along the guideways. This may be done in a variety of ways, including by hand. Pushing means 5 are shown diagrammatically in FIGS. 15 and 16. The pallets 2 are desirably slightly spaced apart as shown in FIGS. 3 and 16 or designed so that motive and locating means may gain a purchase on the pallets. When a pallet is pushed along a guideway the rollers supporting it turn due to the friction of the pallet thereagainst.

The pallets move successively downwardly at the left-hand side of FIG. 3, then across to the right at the bottom of the figure and then upwardly at the right-hand side of the figure. The pallets are moved step by step, at least to the extent that each pallet is stopped and accurately positioned at a rollover station designated R at the left-hand side of FIG. 3 and also so designated in other figures and at an assembling station designated A at the right-hand side of FIG. 3 and also so designated in other figures. Each pallet maintains fixed orientation as shown in FIG. 3 and moves in a horizontal plane. Each pallet has two bores 6 drilled therethrough on the longitudinal center line of the pallet near the ends thereof as shown in FIG. 3 for receiving positioning means to be later described for accurately positioning the pallet at the rollover station R and at the assembling station A.

FIG. 3 and other figures also show a molding station M at which foundry molds are formed of finely divided mold forming material which may be referred to as sand. The molds are formed in slip flasks, i.e., flasks having cooperating elements retractably mounted in fixtures adapting the flasks to be easily and with precision separated or removed from the molds or mold parts formed therein. The term "slip flask" as used herein means, unless the context clearly indicates otherwise, the fixture with the retractable flask elements therein.

In the preferred practice of my invention I form at the molding station M alternately cope molds and drag molds. Each mold is formed in a slip flask. Each drag mold in its slip flask is delivered from the molding station M to the left, viewing FIG. 3, to the rollover station R where it is rolled over and the drag mold deposited on a pallet at the rollover station whereafter the slip flask is removed from the drag mold and the pallet carrying the drag mold moves step by step along the path indicated in FIG. 3 to the assembling station A. Each cope mold in its slip flask is delivered from the molding station M to the right, viewing FIG. 3, to the assembly station A where the cope mold is set atop a drag mold on a pallet at the assembling station. Prior to being so set the cope mold may have a pouring basin and sprue formed therein. Means are desirably provided for preventing the cuttings from falling on the drag mold.

Figure 10:
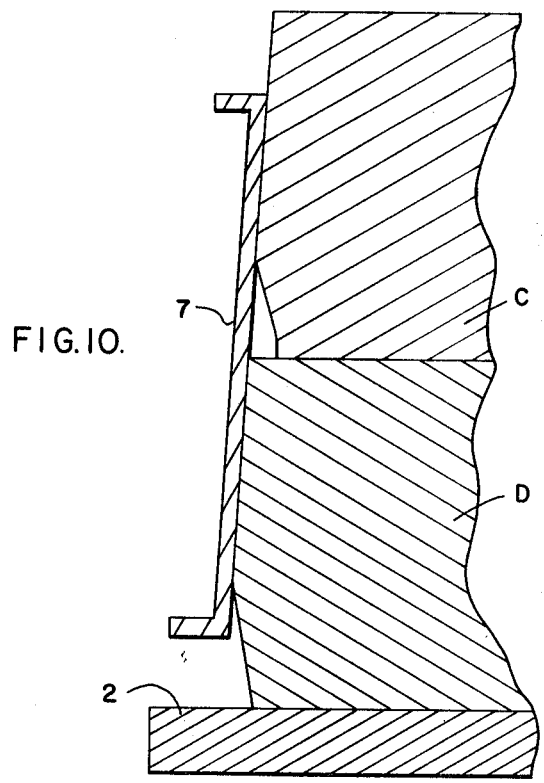
FIG. 10 is a fragmentary diagrammatic vertical cross-sectional view through superposed cope and drag molds on a pallet with a casting collar thereabout.

After the cope mold is set atop the drag mold the slip flask is removed from the cope mold and the pallet carrying the complete or "closed" mold consisting of the cope mold atop the drag mold is advanced upwardly from the assembling station A along the vertical path at the right-hand side of FIG. 3 to the casting station. Referring, for example, to FIG. 10, the cope mold is designated C and the drag mold is designated D. No flasks are about the cope and drag molds when casting, although a casting collar 7 may be positioned about the complete mold to prevent relative shifting of the cope and drag molds during casting.

Figure 1:
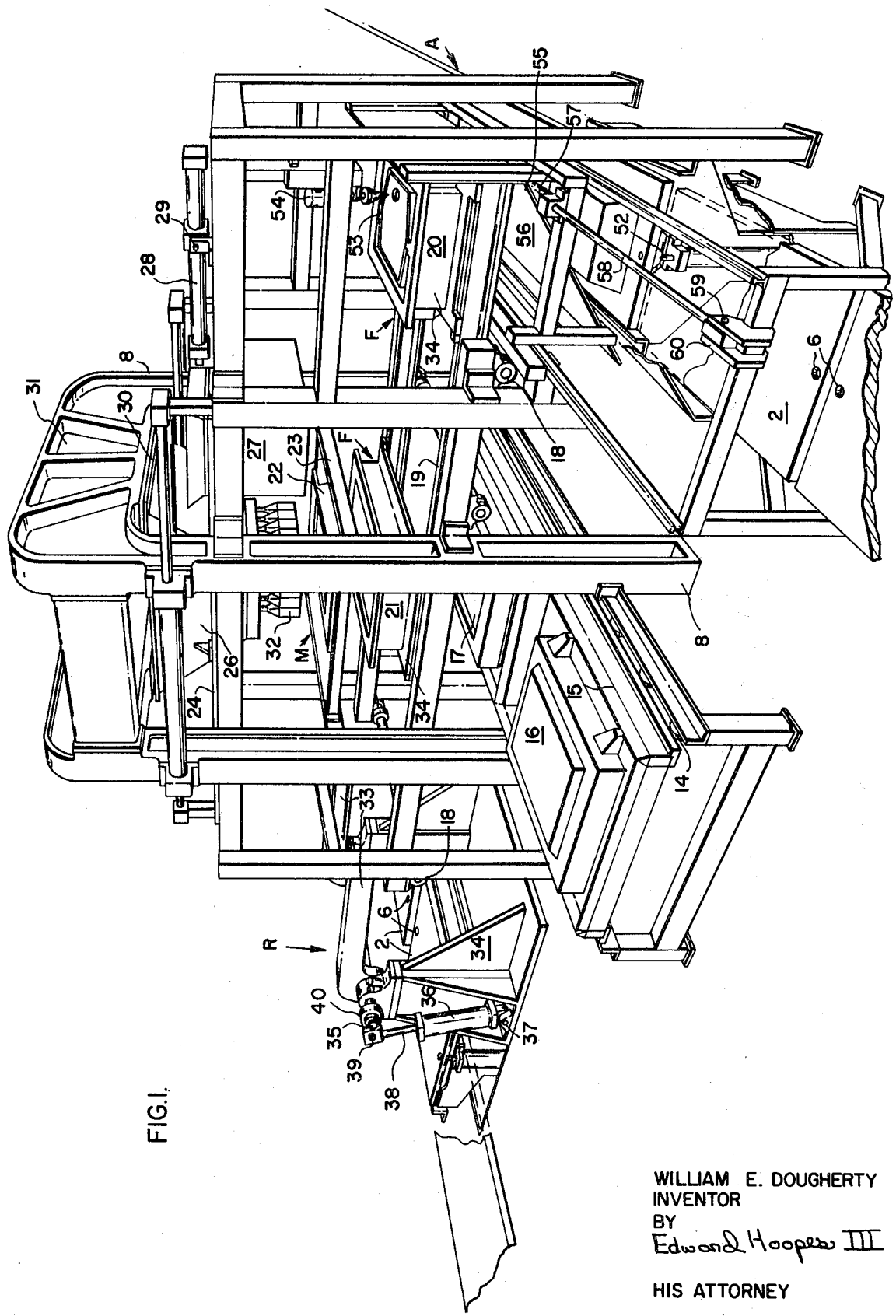
Figure 2:
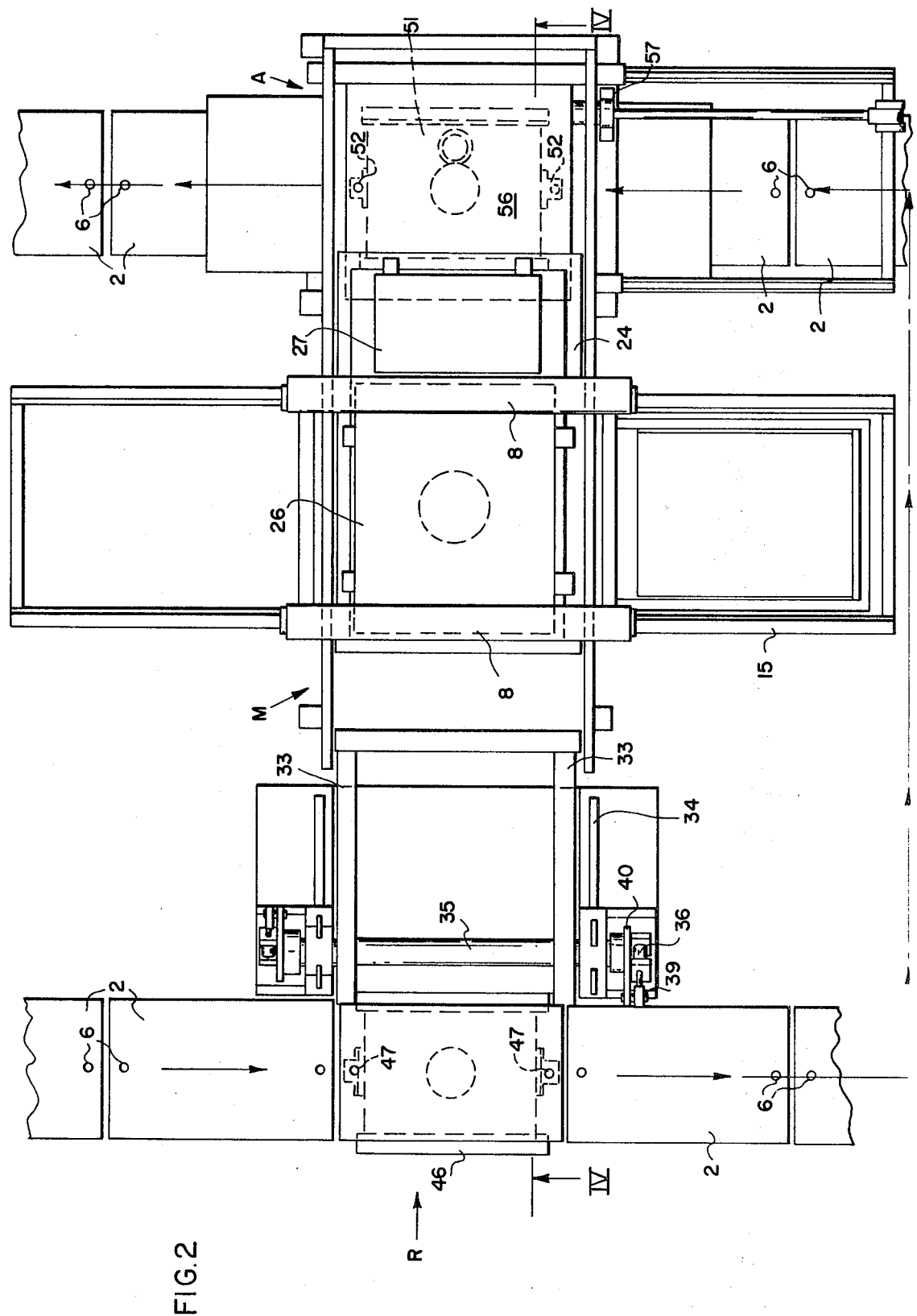
FIG. 2 is a plan view of part of the molding apparatus shown in FIG. 1.
Figure 4:
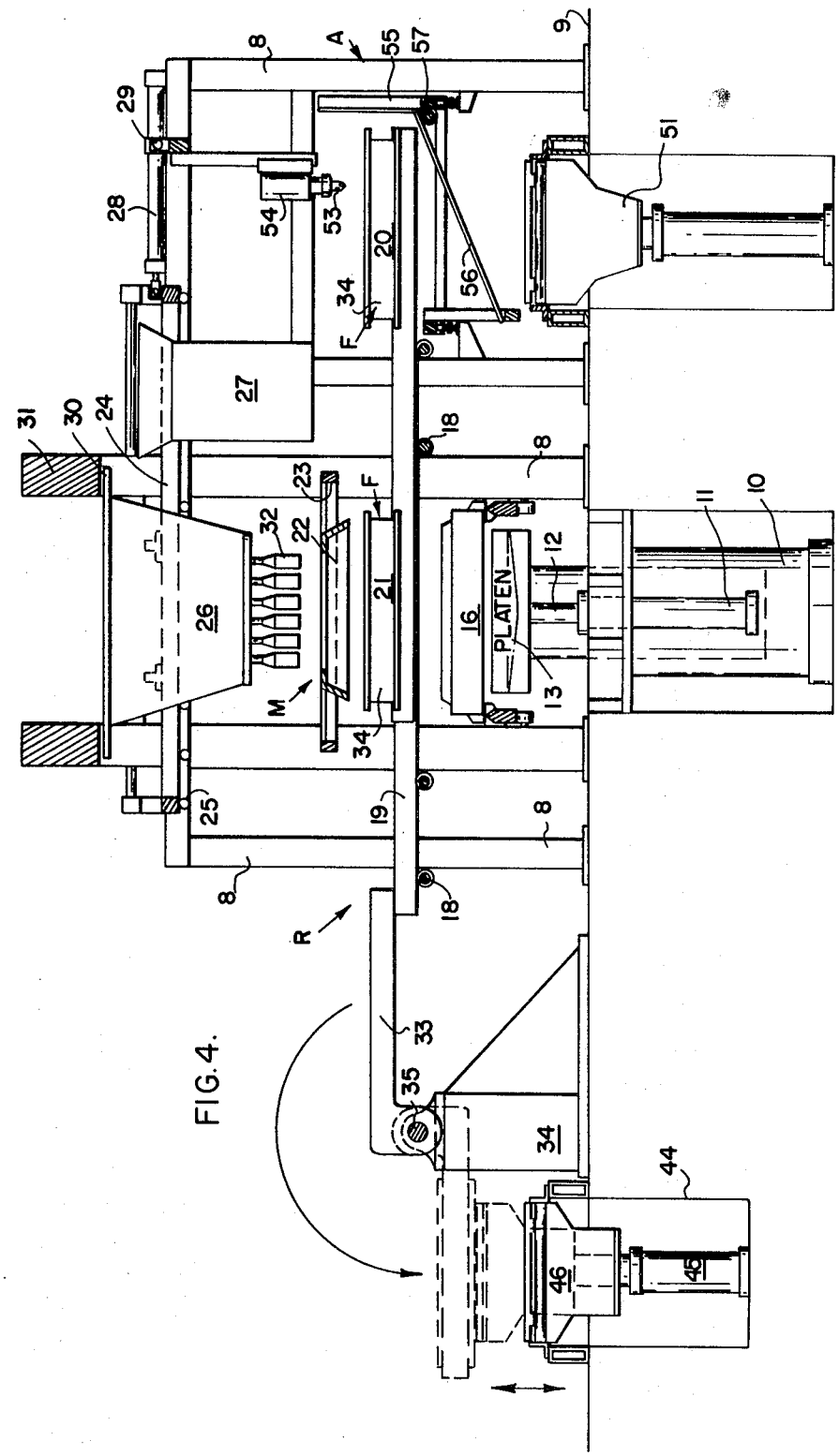
FIG. 4 is a vertical cross-sectional view taken on the line IV—IV of FIG. 2.

Referring to FIGS. 1 and 4, I provide a supporting structure designated generally by reference numeral 8 mounted upon and extending above the floor 9. Disposed generally centrally of the supporting structure is a pit 10 in which is mounted a vertical cylinder 11 in which is disposed a piston carrying a piston rod 12 the upper end of which projects out of the top of the cylinder and above the floor level and carries a platen 13. The platen 13 is shown in its lowermost position with the piston at the bottom of the cylinder 11 in FIG. 4. During operation, as will be described, the piston is moved up to the top of the cylinder, correspondingly elevating the platen 13 through the supporting structure 8.

The supporting structure carries rotatable rollers 14 on which is mounted for horizontal reciprocation perpendicular to the plane of the paper in FIG. 4 a pattern shuttle frame 15. The pattern shuttle frame 15 is adapted to shuttle back and forth between positions in which two patterns carried by the pattern shuttle frame are respectively disposed in vertical alignment with the platen 13. In FIG. 1 the pattern shuttle frame is shown as carrying a cope pattern 16 and a drag pattern 17. The drag pattern 17 is shown in FIG. 1 in position in vertical alignment with the platen 13 although the cylinder 11 and platen 13 are not shown in FIG. 1 to promote clarity of showing of the elements appearing in that figure. In FIG. 1 the cope pattern 16 is disposed generally outwardly of the supporting structure toward the front of the figure where the cope pattern may be placed on the pattern shuttle frame. When the pattern shuttle frame is moved generally toward the rear of FIG. 1 to position the cope pattern 16 in vertical alignment with the platen 13 the drag pattern 17 is disposed generally outwardly of the supporting structure toward the rear of the figure where the drag pattern may be placed on the pattern shuttle frame.

The supporting structure carries rotatable rollers 18 on which is mounted for horizontal reciprocation in the plane of the paper in FIG. 4 a flask shuttle frame 19. The flask shuttle frame 19 is adapted to shuttle back and forth between positions in which two slip flasks carried by the flask shuttle frame are respectively disposed in vertical alignment with the platen 13. In FIGS. 1 and 4 the flask shuttle frame is shown as carrying a cope flask 20 and a drag flask 21. The drag flask 21 is shown in position in vertical alignment with the platen 13 and the cope flask 20 is shown at the assembling station A. When the flask shuttle frame 19 is moved to the left viewing FIGS. 1 and 4 the drag flask 21 is moved to the rollover station R and the cope flask is moved to the position originally occupied by the drag flask, to-wit, in vertical alignment with the platen 13.

An upset 22 is carried by a supporting frame 23 which in turn is carried by the supporting structure 8. The upset is liftable from the supporting frame but when carried by the supporting frame is centered thereby in vertical alignment with the platen 13.

A squeeze head and batch hopper shuttle frame 24 is mounted to shuttle back and forth horizontally in the plane of the paper viewing FIG. 4 on rollers 25 carried by the supporting structure 8. The shuttle frame 24 carries a squeeze head 26 having squeeze feet 32 and a batch hopper 27. The shuttle frame 24 is moved back and forth by a piston operated by fluid under pressure in a cylinder 28 trunnioned to the supporting structure 8 at 29. In FIG. 4 the piston is at the right-hand end of the cylinder 28 and the squeeze head 26 is in vertical alignment with the platen 13. When the piston moves to the left-hand end of the cylinder 28 the batch hopper moves to a position in vertical alignment with the platen 13. When the squeeze head is in vertical alignment with the platen 13 portions 30 thereof closely underlie portions 31 of the supporting structure 8 to resist upward thrust of the squeeze head during the squeezing operation as will be presently described.

As shown in FIG. 4, the platen 13, the pattern shuttle frame 15 with patterns 16 and 17 thereon, the flask shuttle frame 19 with slip flasks 20 and 21 thereon, the supporting frame 23 with the upset 22 thereon and the squeeze head and batch hopper shuttle frame 24 with the squeeze head 26 and the batch hopper 27 thereon are at successively higher elevations. With the elements in the positions shown in FIG. 4 a molding cycle is initiated by controlled upward movement of the piston in the cylinder 11 raising the piston rod 12 and the platen 13, which engages and raises the pattern 17 (see FIG. 1) which is lifted by the platen from the pattern shuttle frame 15, the platen passing through the pattern shuttle frame. Similarly continued upward movement of the platen results in picking up the slip flask 21 from the flask shuttle frame 19 and the upset 22 from the supporting frame 23. Simultaneously the batch hopper 27 containing a batch of sand is shifted into position centered above the upset 22 by movement of the shuttle frame 24 to the left viewing FIG. 4. As soon as the upset is picked up by the platen, pattern and flask the gates of the batch hopper are opened and the batch of sand is dumped through the upset onto the pattern in the flask. At this point there may, if required, be a momentary dwell in the upward movement of the platen, which upward movement is controlled by the valving conducting the fluid under pressure to and from the cylinder 11 with either manual or automatic control means well within the capability of those skilled in the art. As soon as the sand has been dumped from the batch hopper the shuttle frame 24 is shifted back to the right to the position shown in FIG. 4 with the squeeze head centered above the pattern, flask and upset. The batch hopper 27 is thus returned to the position in which it is shown in FIG. 4 in which it may receive a new batch of sand for the succeeding cycle.

Upward movement of the platen is continued or resumed to bring the squeeze head 26 into operative position with respect to the sand in the flask. At that point upward movement of the platen stops, which may be accomplished by the piston in the cylinder 11 reaching the upper cylinder head. Then the squeeze head is pressurized and the mold squeezed. If desired, jolting may be performed just before and/or during squeezing.

Upon completion of squeezing of the mold the squeeze feet 32 return to their dwell position as shown in FIG. 4 and the platen is lowered to the position shown in FIG. 4, depositing the upset 22 on the supporting frame, depositing the slip flask 21 with the drag mold D therein on the flask shuttle frame 19 and drawing the pattern 17 from the flask and mold and depositing the pattern 17 on the pattern shuttle frame 15.

The pattern shuttle frame 15 may then be shifted to position the cope pattern 16 above the pattern 13 and the flask shuttle frame 19 may be shifted to position the cope flask 20 above the platen 13 and the cope pattern 16 for the succeeding cycle which forms a cope mold C in the cope flask 20. Shifting of the flask shuttle frame 19 to the left, viewing FIG. 4, moves the slip flask 21 with the drag mold D therein under and in operative relationship to a stationary strike-off blade (not shown) which levels the sand at the upper surface of the flask and into cooperative relationship with rollover means comprising spaced apart arms 33 which enter the grooves 34 (FIG. 1) at the sides of the flask.

Figure 5:
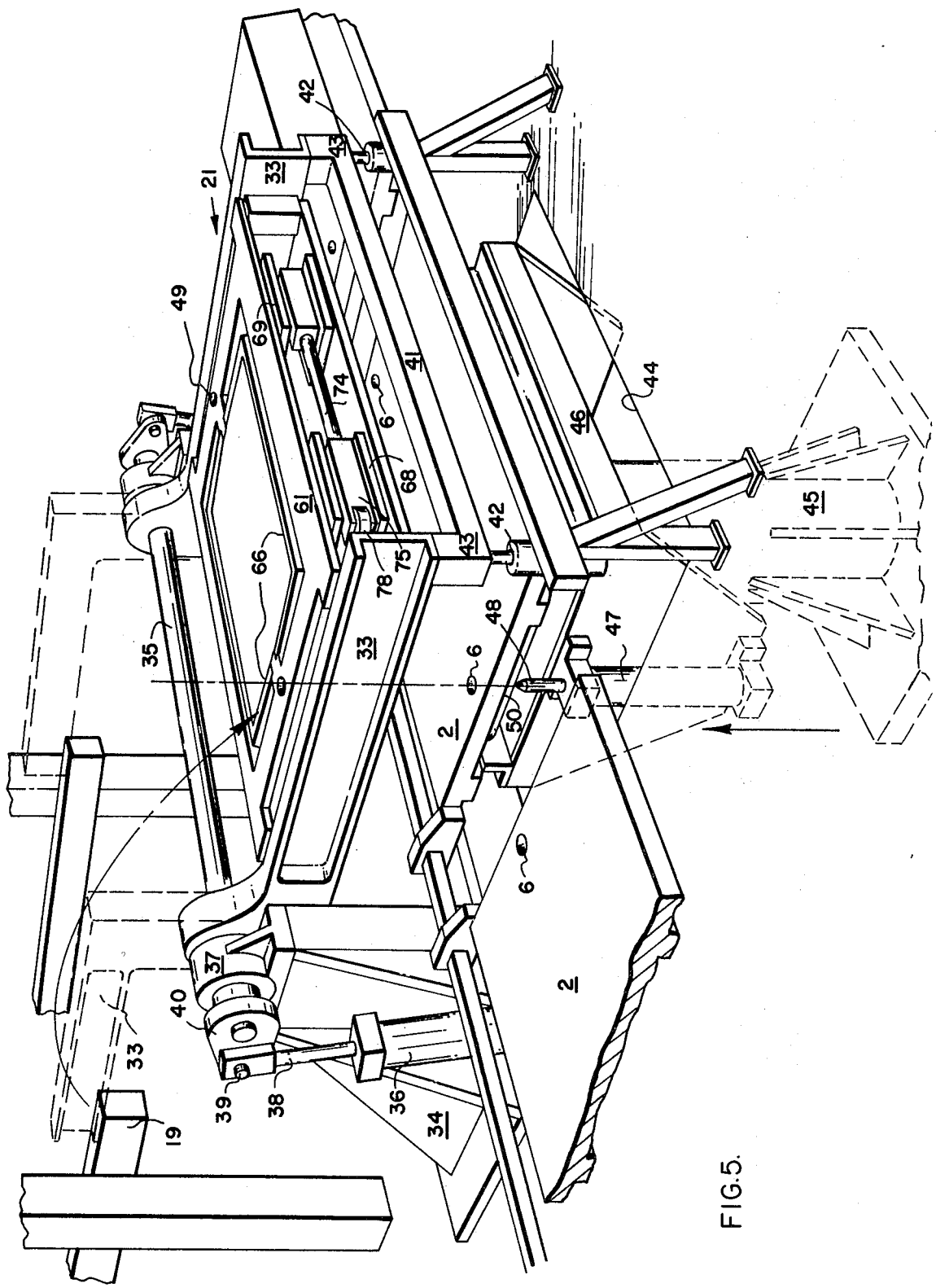
FIG. 5 is an enlarged perspective view of the rollover station as viewed from the rear of FIG. 1.

The structure at the rollover station (see particularly FIGS. 1, 4 and 5) comprises a base or mounting structure 34 in which is journaled a horizontal shaft 35 to which the rollover means comprising the spaced apart arms 33 are fixed. The shaft 35 is turned between positions in which the arms 33 extend substantially horizontally inwardly as shown in FIGS. 1 and 4 and in which the arms 33 extend substantially horizontally outwardly as shown in FIG. 5 by fluid pressure actuated pistons operating in cylinders 36 at the respective ends of the shaft 35 trunnioned to the base 34 at 37, each piston having a piston rod 38 pivotally connected at 39 to a short arm 40 fixed to the shaft 35. Thus the shaft is turned approximately 180° to "roll over" or invert the slip flask 21 with the drag mold D therein, lifting the flask and mold from the shuttle frame 19. The rolled over slip flask and drag mold are accurately oriented horizontally at the rollover station R by shock absorbers 42 which decelerate the rollover motion and determine the final horizontal location of the rolled over slip flask and drag mold. The shock absorbers 42 are engaged by portions 43 of a member 41 which is part of the rollover frame and permanently fixed to the arms 33 to lend support and stability.

At the rollover station is a pit 44 in which is mounted a vertical cylinder 45 in which operates through fluid pressure a piston carrying an elevator 46. The elevator 46 is retractable downwardly to a position just below the level of the empty pallets 2 as they move downwardly in their path at the upper left-hand corner of FIG. 3 to the rollover station and is advanceable upwardly to raise a pallet from such path as will be explained. The elevator 46 carries at opposite ends in the direction of the path of movement of the empty pallets to the rollover station vertical cylinders 47 in each of which operates by fluid pressure a piston carrying an upwardly projecting guide rod 48 having its upper end pointed.

The fixture of each slip flask has opposed bores 49 drilled therethrough of the same diameter and in the same spacing as the bores 6 of the pallets 2, such spacing being the same as the spacing of the guide rods 48. The diameter of the guide rods is such that the guide rods fit snugly but slidably in the bores 6 and 49 which may be bushed to guidingly receive the guide rods.

When a drag flask with a drag mold therein is rolled over at the rollover station R an empty pallet is disposed at the rollover station where it is supported by rollers 50 at the top of the elevator 46, the elevator being at the bottom of its stroke. As soon as the flask and mold have been rolled over the pointed guide rods 48 are projected upwardly to pass through the bores 6 of the pallet and the bores 49 of the flask and accurately center the pallet and the rolled over flask and mold at the rollover station. Either simultaneously with or immediately following the upward projection of the guide rods 48 the elevator is raised to raise the pallet into supporting relationship to the mold in the flask. Then the flask is separated from the mold by retracting the retractable flask elements within the fixture as will be presently described.

When the retractable elements of the slip flask have been retracted from the drag mold to free the mold from the flask the elevator 46 carrying the drag mold and the guide rods 48 are lowered. The drag mold is thus lowered to an elevation such that it is entirely below the flask. In such position the pallet is back in its original horizontal path and the pallet carrying the drag mold is advanced along the path illustrated in FIG. 3 to the assembling station A as above described.

The rollover means comprising the spaced apart arms 33 carrying the open and empty slip flask 21 are turned back approximately 180° from the position of FIG. 5 to the position of FIGS. 1 and 4 and the flask is deposited on the flask shuttle frame 19. While the operations at the rollover station R which have just been described were being performed a cope mold was being formed in the cope flask 20 at the molding station M in the same manner as above described with respect to formation of the drag mold in the drag flask 21. By the time the open and empty drag flask 21 has been deposited on the flask shuttle frame 19 the cope mold C which has been formed in the cope flask 20 at the molding station M is disposed on the flask shuttle frame. The flask shuttle frame is then shifted to the right viewing FIG. 4 to the position shown in that figure moving the cope flask 20 with the cope mold C therein to the assembling station A and the empty drag flask 21 to the molding station M. The drag flask may be closed before, during or after its movement from the rollover station R to the molding station M. Automatic means for closing the flask as it moves from the rollover station to the molding station will be presently described.

At the assembling station A there is an elevator 51 carrying guide rods 52 which functions in the same manner as the elevator 46 carrying the guide rods 48 at the rollover station R. Also at the assembling station is a sprue cutter 53 carried by a piston in a vertical cylinder 54 carried by the supporting structure 8. Means are provided for rotating the sprue cutter as it is lowered as well known to those skilled in the art.

A sand shield 55 shown as including an inclined plate 56 is slidably mounted in the supporting structure at the assembling station A and is adapted to be positioned as shown in FIG. 1 with the inclined plate 56 under the cope slip flask 20 containing the cope mold C when the sprue is cut in the mold C and the pouring basin formed or cleaned up as the case may be to prevent the cuttings from falling on the underlying drag mold. The sand shield is moved between operative position underlying the cope mold and flask and inoperative position withdrawn from such underlying position by a piston in a cylinder 57. In the form shown the cylinder is carried by the sand shield and the piston rod 58 is connected at 59 to a bracket 60 carried by the supporting structure.

Figure 6:
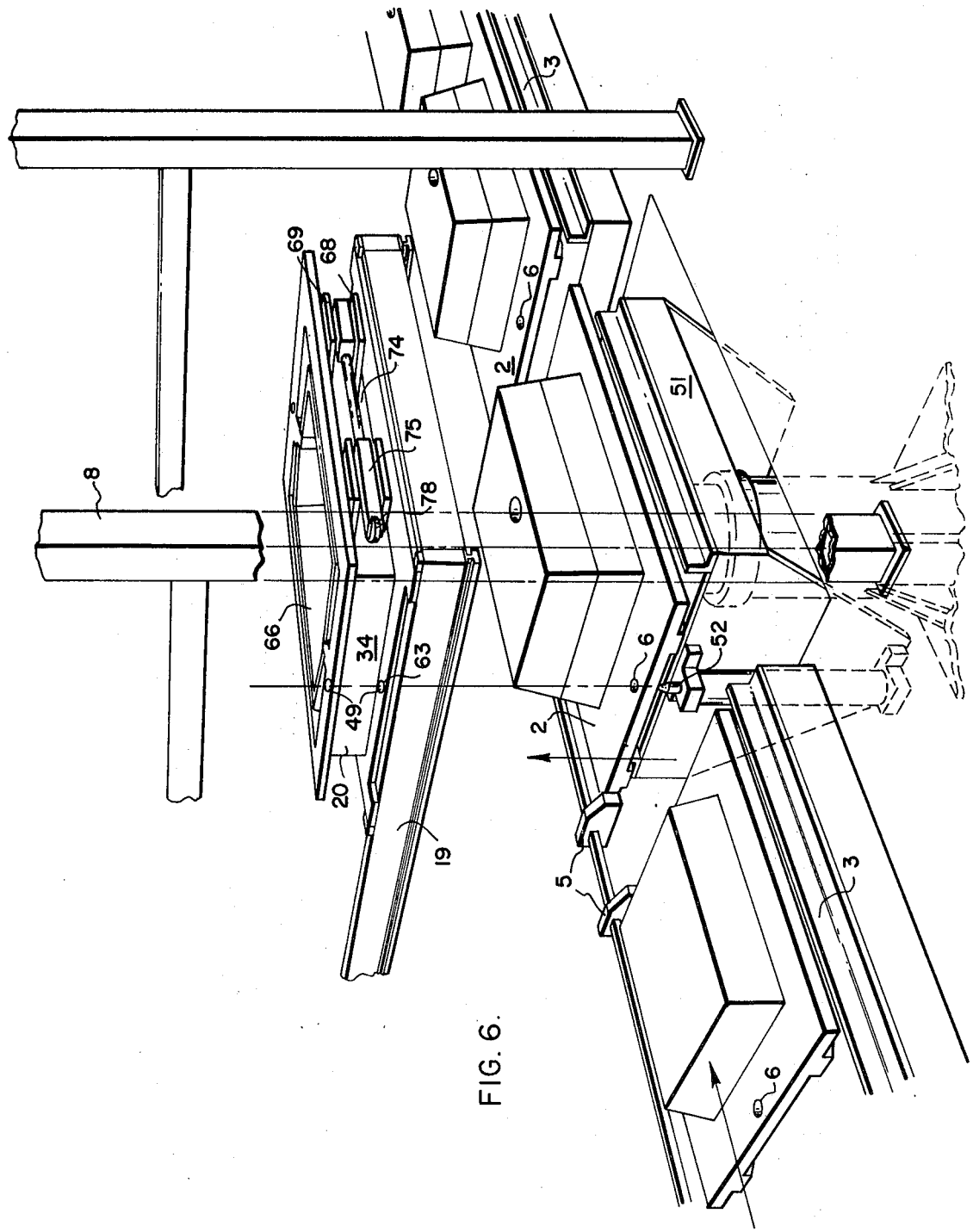
FIG. 6 is an enlarged perspective view of the assembling station as viewed from the front of FIG. 1.

With a pallet carrying a drag mold D at the assembling station A the flask 20 with the cope mold C therein is disposed at the assembling station as shown in FIGS. 1, 4 and 6. With the sand shield in operative position the sprue is cut and the pouring basin formed or cleaned up. Then the sand shield is moved to inoperative position and the elevator 51 and guide rods 52 are raised until the cope mold seats on the drag mold on the pallet. The cope slip flask is removed from the cope mold and the elevator is lowered and the pallet with the complete or closed mold thereon is advanced to the casting station. The empty flask is returned to the molding station M by movement of the shuttle frame 19 to the left viewing FIG. 4. The flask may be closed as above described with respect to the drag flask.

The slip flasks employed may assume a wide variety of forms; however, each slip flask has cooperating flask elements retractably mounted in a fixture adapting the flask to be easily and with precision separated or removed from the mold or mold part formed therein. The flask elements fit precisely together when assembled. The means for positioning the flask with respect to cooperating portions of the apparatus are on the fixture, such, for example, as bores for receiving guide rods.

Figure 7:
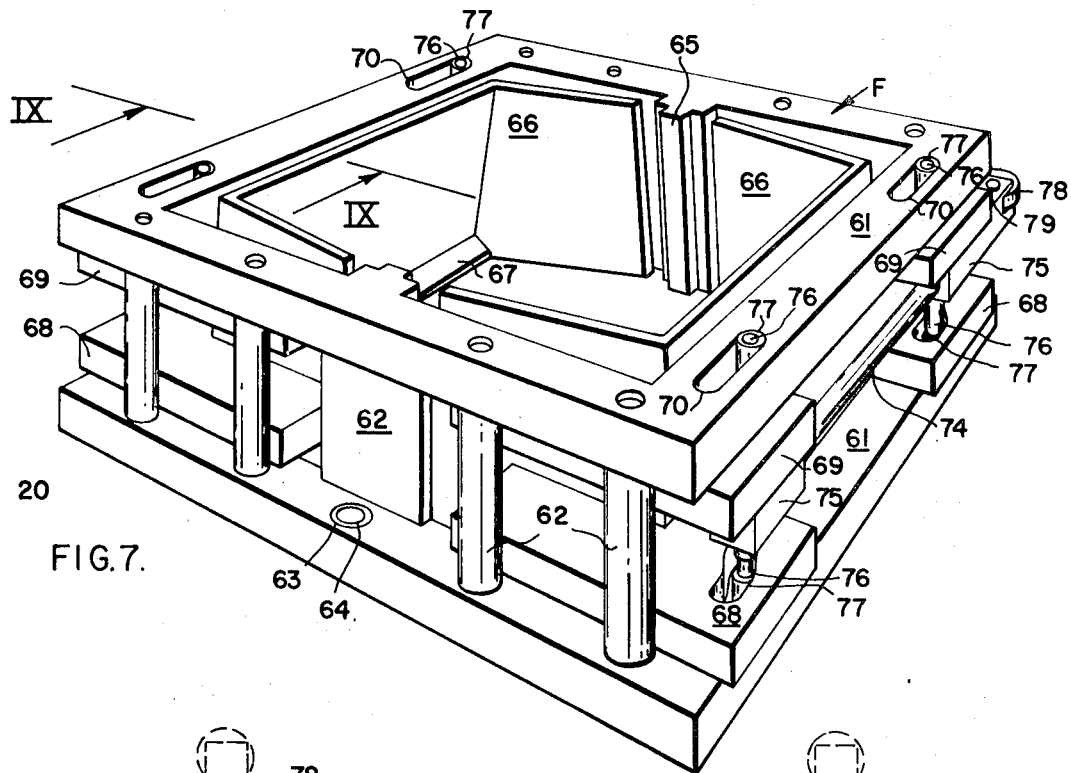
FIG. 7 is a perspective view of one form of slip flask.
Figure 8:
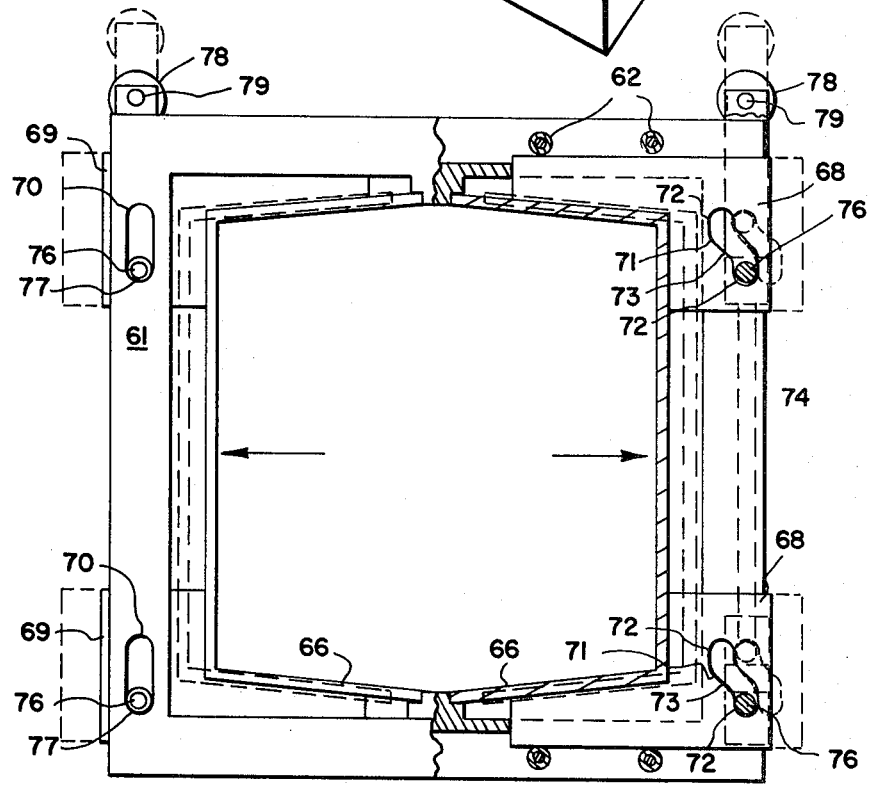
FIG. 8 is a view partly in plan and partly in horizontal cross-section of the slip flask shown in FIG. 7.
Figure 9:
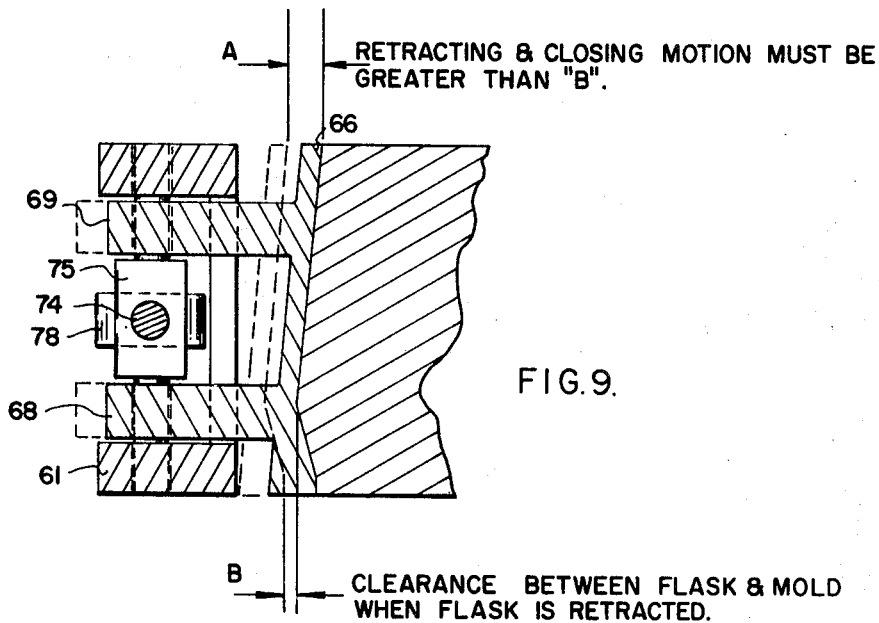
FIG. 9 is an enlarged fragmentary vertical cross-sectional view taken on the line IX—IX of FIG. 7.

FIGS. 7, 8 and 9 show one form of slip flask. The flask comprises a fixture F having upper and lower heads 61 joined by uprights 62. Opposed bores 63 containing bushings 64 are provided for receiving guide rods. While the bores and bushings are shown only in the lower head similar aligned bores and bushings may be provided in the upper head if desired or required. The upper and lower heads 61 may be identical; each is in the form of a hollow square. The central upright at each side has an inward projection 65 serving as positioning means for the flask elements when in operative position.

The opposed flask elements 66 are symmetrically formed, each being of generally U shape as shown in FIG. 7 with an inwardly inclined rib 67 at the bottom. Each of the flask elements 66 also has at its lower portion two generally horizontally projecting elements 68 overlying the lower head 61 and at its upper portion two generally horizontally projecting elements 69 underlying the upper head 61.

Each of the upper and lower heads 61 has therethrough four straight parallel slots 70 as shown in FIG. 7. Each of the elements 68 and 69 has therethrough a slot 71 having short straight end portions 72 parallel to the slots 70 and an inclined intermediate portion 73 as shown in FIG. 8. At each side of the flask a rod 74 extends generally parallel to the slots 70 and has squared portions 75 interposed between the elements 68 and 69 as shown in FIG. 7. Pins 76 extend vertically through the respective squared portions 75. Each pin 76 extends through the slots 71 and 70 above and below the portion 75 carrying the pin. The pins may be provided with rollers 77 disposed within the slots 70 and 71.

The slip flask is closed by movement of the rods 74 toward the lower edge of FIG. 8. The pins 76 are guided in a straight line by the slots 70. As the pins move toward the lower edge of FIG. 8 they act in cam fashion against the inclined intermediate portions 73 of the slots 71 and move the opposed flask elements 66 toward each other. The slots 71 are symmetrically arranged at the respective sides of the flask so that movement of the rods 74 toward the lower edge of FIG. 8 shifts the right-hand flask element 66 to the left and shifts the left-hand flask element 66 to the right. The parts are designed and proportioned so that when the pins 76 are in the straight portions 72 of the slots 71 nearer the lower edge of FIG. 8 as shown in full lines in that figure the slip flask is closed with the edges of the flask elements 66 held tightly against the positioning projections 65 of the fixture F also as shown in full lines in FIG. 8, while when the pins 76 are in the straight portions 72 of the slots 71 nearer the upper edge of FIG. 8 as shown in broken lines in that figure the slip flask is open with the flask elements 66 spread apart as shown in broken lines in FIG. 8 and in solid lines in FIG. 7.

Figure 11:
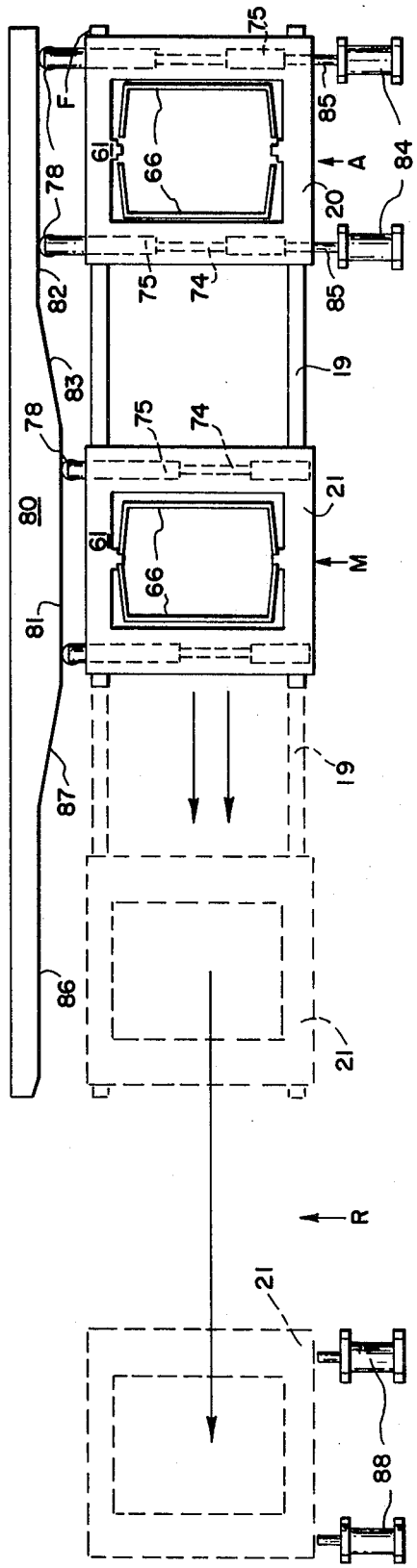
FIG. 11 is a diagram illustrating means for opening and closing slip flasks of the type shown in FIG. 7.

The slip flask may be opened and closed by shifting the rods 74 by hand or by mechanism. FIG. 11 illustrates diagrammatically how this may be done by mechanism. A cope flask is illustrated in that figure in open position at the assembling station A and in closed position at the molding station M. The flask is like that shown in FIGS. 7 and 8. The portions 75 nearer the upper edge of the figure in each of FIGS. 7, 8 and 11 are extended beyond the fixture F and each carries a roller 78 mounted for rotation on a vertical pin 79. A cam 80 is mounted in the supporting structure in position to be engaged by the rollers 78 as the flask moves from the assembling station A to the molding station M. As shown in FIG. 11, the cam 80 has a wide portion 81 opposite the molding station M and a relatively narrow portion 82 opposite the assembling station A so that the operative face of the cam, i.e., the face engaged by the rollers 78, is closer to the flask at the molding station M than at the assembling station A. The portions 81 and 82 of the cam are connected by an inclined portion 83.

At the assembling station A two horizontally oriented cylinders 84 are mounted with their axes in line with the rods 74 of the flask when the flask is at the assembling station A. A piston operates in each cylinder by fluid pressure. The piston rods 85 project through the cylinder heads nearer the flask as shown in FIGURE 11, the outer extremities of the piston rods being adapted to pushingly engage the nearer portions 75 to move the rods 74 from the position in which they are shown at the molding station M to the position in which they are shown at the assembling station A in FIG. 11.

As a cope flask begins its movement from right to left viewing FIG. 11 from the assembling station A to the molding station M the flask is open as shown at the assembling station A in FIG. 11. As such movement continues the inclined portion 83 of the cam 80 cams the rollers 78 in the direction toward the lower edge of FIG. 11 resulting in closing the flask. The flask remains closed until the proper time in the cycle when with a cope mold therein back at the assembling station A it is to be opened as described above. At such time the pistons in the cylinders 84 are moved in the direction toward the upper edge of FIG. 11 pushing the rods 74 until the rollers 78 engage the portion 82 of the cam 80, opening the flask.

FIG. 11 also shows the cam 80 extended to the left to the rollover station R and having portions 86 and 87 corresponding respectively with the portions 82 and 83. The figure further shows cylinders 88 mounted at the rollover station R. The cam and the pistons in the cylinders close and open the drag flask in the same manner as above described in relation to the cope flask.

Figure 12:
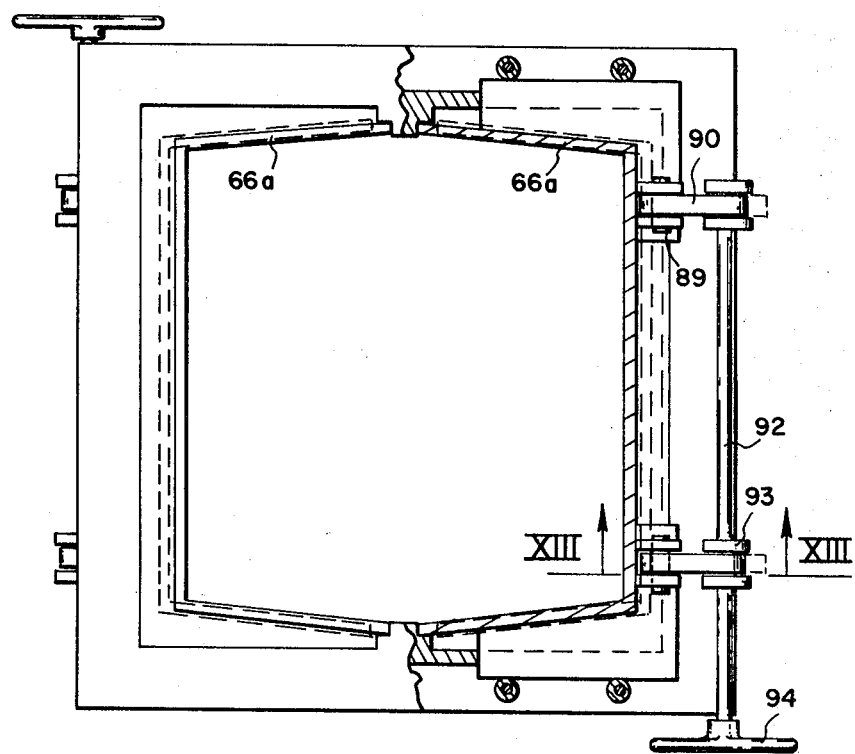
FIG. 12 is a view like FIG. 8 of a different form of slip flask.
Figure 13:
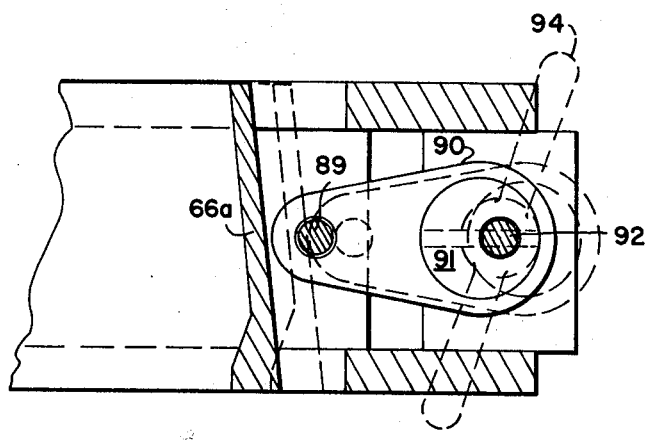
FIG. 13 is an enlarged fragmentary vertical cross-sectional view taken on the line XIII—XIII of FIG. 12.

FIGS. 12 and 13 show a modified form of slip flask. The flask elements 66a in FIGS. 12 and 13 are identical to the flask elements 66 above described in respect to mold formation but the means for opening and closing the flask are different. The flask is symmetrical so description of one side will suffice for both. Pivoted to the flask element 66a by pins 89 are two parallel links 90. The outer end of each link 90 is disposed about an eccentric 91 fixed to a shaft 92, the two eccentrics 91 being identically oriented on the shaft. The shaft 92 is journaled in bearings 93 mounted on the fixture of the flask. A handwheel 94 is fixed to the shaft 92 for turning the shaft.

The flask of FIGS. 12 and 13 is opened and closed by turning the two handwheels 94. Turning of the two shafts 92 turns the eccentrics 91 which moves the links 90 and the flask elements 66a in or out depending on whether the eccentrics are turned toward or away from the flask. In FIGS. 12 and 13 the flask elements are shown closed in solid lines and open in broken lines. In FIG. 13 the eccentrics 91 and the links 90 are shown in their inward position (flask closed) in solid lines and in their outward position (flask open) in broken lines.

While I have shown and described certain present preferred embodiments of the invention and certain present preferred methods of practicing the same it is to be distinctly understood that the invention is not limited thereto but may be otherwise variously embodied and practiced within the scope of the following claims.

I claim:

1. A molding method comprising forming a cope mold in a first slip flask having a pattern therein, drawing said pattern, forming a drag mold in a second slip flask having a pattern therein, drawing said second mentioned pattern, inverting the second slip flask with the drag mold therein, supporting the drag mold and removing the second slip flask therefrom and thereafter placing the cope mold on the drag mold and removing the first slip flask from the cope mold.

2. A molding method comprising forming a cope mold in a first slip flask having a pattern therein, drawing said pattern, forming a drag mold in a second slip flask having a pattern therein, drawing said second mentioned pattern, inverting the second slip flask with the drag mold therein, supporting the drag mold and removing the second slip flask therefrom, disposing the cope mold in the first slip flask above the drag mold, raising the drag mold until the cope mold seats on the drag mold, releasing the first slip flask from the cope mold and lowering the drag mold with the cope mold seated thereon until the cope mold is clear of the first slip flask.

3. A molding method comprising forming alternately at a common molding station cope molds in first slip flasks having patterns therein and drag molds in second slip flasks having patterns therein, drawing the patterns from the flasks, inverting the second slip flasks with the drag molds therein, supporting the drag molds and removing the second slip flasks therefrom, disposing cope molds in first slip flasks above the supported drag molds successively at an assembling station, relatively moving each such cope mold in a first slip flask and drag mold generally vertically at the assembling station until the cope mold seats on the drag mold, releasing the first slip flask from the cope mold and relatively moving the assembled molds and the first slip flask generally vertically until the cope mold is clear of the first slip flask.

4. A molding method comprising forming alternately at a common molding station cope molds in first slip flasks having patterns therein and drag molds in second slip flasks having patterns therein, drawing the patterns from the slip flasks, delivering the slip flasks with the cope and drag molds respectively therein in opposite directions from the molding station, the first slip flasks with the cope molds therein in one direction and the second slip flasks with the drag molds therein in the opposite direction, inverting the second slip flasks with the drag molds therein, supporting the drag molds and removing the second slip flasks therefrom, delivering the first slip flasks with the cope molds therein successively to an assembling station, delivering the drag molds successively to the assembling station below the first slip flasks with the cope molds therein and at the assembling station relatively moving each such cope mold in a first slip flask and drag mold generally vertically until the cope mold seats on the drag mold, releasing the first slip flask from the cope mold and relatively moving the assembled molds and the first slip flasks generally vertically until the cope mold is clear of the first slip flask.

5. A molding method comprising forming a cope mold in a first slip flask having a pattern therein, drawing said pattern, forming a drag mold in a second slip flask having a pattern therein, drawing said second mentioned pattern, inverting the second slip flask with the drag mold therein, supporting the drag mold and removing the second slip flask therefrom and thereafter disposing the cope mold in the first slip flask above the drag mold, cutting a sprue in the cope mold, intercepting the cuttings so that they do not fall on the drag mold, relatively moving the cope mold in the first slip flask and the drag mold generally vertically until the cope mold seats on the drag mold and removing the first slip flask from the cope mold.

6. A molding method comprising forming a cope mold in a first slip flask having a pattern therein, drawing said pattern, forming a drag mold in a second slip flask having a pattern therein, drawing said second mentioned pattern, inverting the second slip flask with the drag mold therein, supporting the drag mold and removing the second slip flask therefrom, disposing the cope mold in the first slip flask above the drag mold, cutting a sprue in the cope mold, disposing a shield generally above the drag mold and below the cope mold during cutting of the sprue in the cope mold to intercept the cuttings so that they do not fall on the drag mold, after cutting of the sprue in the cope mold removing the shield, relatively moving the cope mold in the first slip flask and the drag mold generally vertically until the cope mold seats on the drag mold and removing the first slip flask from the cope mold.

7. Molding apparatus comprising means for forming alternately at a common molding station cope molds in first slip flasks having patterns therein and drag molds in second slip flasks having patterns therein, means for drawing the patterns from the slip flasks, means for delivering the slip flasks with the cope and drag molds respectively therein in opposite directions from the molding station, the first slip flasks with the cope molds therein in one direction and the second slip flasks with the drag molds therein in the opposite direction, means for inverting the second slip flasks with the drag molds therein, means for supporting the drag molds and removing the second slip flasks therefrom, means for delivering the first slip flasks with the cope molds therein successively to an assembling station, means for delivering the drag molds successively to the assembling station below the first slip flasks with the cope molds therein and means at the assembling station relatively moving each such cope mold in a first slip flask and drag mold generally vertically until the cope mold seats on the drag mold, releasing the first slip flask from the cope mold and relatively moving the assembled molds and the first slip flask generally vertically until the cope mold is clear of the first slip flask.

8. Molding apparatus comprising means for forming alternately at a common molding station cope molds in first slip flasks having patterns therein and drag molds in second slip flasks having patterns therein, means for drawing the patterns from the slip flasks, means for delivering the slip flasks with the cope and drag molds respectively therein in opposite directions from the molding station, the first slip flasks with the cope molds therein in one direction and the second slip flasks with the drag molds therein in the opposite direction, means for inverting the second slip flasks with the drag molds therein, means for supporting the drag molds and removing the second slip flasks therefrom, means for delivering the first slip flasks with the cope molds therein successively to an assembling station, means for delivering the drag molds successively to the assembling station below the first slip flasks with the cope molds therein and means at the assembling station elevating each drag mold until the cope mold seats on the drag mold, releasing the first slip flask from the cope mold and relatively moving the assembled molds and the first slip flask generally vertically until the cope mold is clear of the first slip flask.

9. Molding apparatus as claimed in claim 8 in which means are provided for lowering the assembled molds until the cope mold is clear of the first slip flask.

10. Molding apparatus as claimed in claim 7 including means mounted on a fixed base for actuating the releasing means.

11. Molding apparatus comprising a first slip flask and pattern for forming a cope mold, a second slip flask and pattern for forming a drag mold, means for introducing mold forming material into the flasks upon the patterns, means for compacting the introduced mold forming material to form cope and drag molds, means for drawing the patterns, means for inverting the second slip flask with the drag mold therein, means for supporting the drag mold and removing the sceond slip flask therefrom, means for placing the cope mold on the drag mold and means for removing the first slip flask from the cope mold, a common station being provided for forming the cope mold in the first slip flask and the drag mold in the second slip flask and another station being provided at which the cope mold is placed on the drag mold and transfer means being provided for transferring the molds between the stations, means being provided for forming at the common station alternately cope molds in first slip flasks and drag molds in second slip flasks, the transfer means being constructed and arranged to transfer the molds from the common station in opposite directions, the cope molds in one direction and the drag molds in the opposite direction.

12. Molding apparatus comprising a first slip flask and pattern for forming a cope mold, a second slip flask and pattern for forming a drag mold, means for introducing mold forming material into the flasks upon the patterns, means for compacting the introduced mold forming material to form cope and drag molds, means for drawing the patterns, means for inverting the second slip flask with the drag mold therein, means for supporting the drag mold and removing the second slip flask therefrom, means for placing the cope mold on the drag mold and means for removing the first slip flask from the cope mold, means being provided for disposing the first slip flask with the cope mold therein above the drag mold together with means for relatively moving the first slip flask with the cope mold therein and the drag mold generally vertically until the cope mold seats on the drag mold and means for removing the first slip flask from the cope mold, means being provided for releasing the first slip flask from the cope mold together with means for relatively moving the assembled molds and the first slip flask generally vertically until the cope mold is clear of the first slip flask.

13. Molding apparatus comprising a first slip flask and pattern for forming a cope mold, a second slip flask and pattern for forming a drag mold, means for introducing mold forming material into the flasks upon the patterns, means for compacting the introduced mold forming material to form cope and drag molds, means for drawing the patterns, means for inverting the second slip flask with the drag mold therein, means for supporting the drag mold and removing the second slip flask therefrom, means for placing the cope mold on the drag mold and means for removing the first slip flask from the cope mold, means being provided for disposing the first slip flask with the cope mold therein above the drag mold together with means for elevating the drag mold until the cope mold seats on the drag mold and means for removing the first slip flask from the cope mold, means being provided for releasing the first slip flask from the cope mold together with means for lowering the assembled molds until the cope mold is clear of the first slip flask.

14. Molding apparatus comprising a first slip flask and pattern for forming a cope mold, a second slip flask and pattern for forming a drag mold, means for introducing mold forming material into the flasks upon the patterns, means for compacting the introduced mold forming material to form cope and drag molds, means for drawing the patterns, means for inverting the second slip flask with the drag mold therein, means for supporting the drag mold and removing the second slip flask therefrom, means for placing the cope mold on the drag mold and means for removing the first slip flask from the cope mold, means being provided for disposing the first slip flask with the cope mold therein above the drag mold together with means for relatively moving the first slip flask with the cope mold therein and the drag mold generally vertically until the cope mold seats on the drag mold and means for removing the first slip flask from the cope mold, means being provided for cutting a sprue in the cope mold while the first slip flask with the cope mold therein is disposed above the drag mold together with a shield for intercepting the cuttings so that they do not fall on the drag mold.

15. Molding apparatus as claimed in claim 14 in which means are provided for moving the shield between an operative position generally above the drag mold and below the cope mold during cutting of the sprue in the cope mold and an inoperative position leaving clear the space between the bottom of the cope mold and the top of the drag mold after cutting of the sprue in the cope mold.

16. Molding apparatus comprising a first slip flask and pattern for forming a cope mold, a second slip flask and pattern for forming a drag mold, means for introducing mold forming material into the flasks upon the patterns, means for compacting the introduced mold forming material to form cope and drag molds, means for drawing the patterns, means for inverting the second slip flask with the drag mold therein, means for supporting the drag mold and removing the second slip flask therefrom, means for placing the cope mold on the drag mold and means for removing the first slip flask from the cope mold, a common station being provided for forming the cope mold in the first slip flask and the drag mold in the second slip flask and another station being provided at which the cope mold is placed on the drag mold and transfer means being provided for transferring the molds between the stations, means being provided for moving the slip flasks to the common station together with means for closing the slip flasks as they move to the common station.

17. Molding apparatus as claimed in claim 16 in which the means for closing the slip flasks are stationary means engaging portions of the slip flasks as the slip flasks move to the common station.

18. Molding apparatus comprising a first slip flask and pattern for forming a cope mold, a second slip flask and pattern for forming a drag mold, means for introducing mold forming material into the flasks upon the patterns, means for compacting the introduced mold forming material to form cope and drag molds, means for drawing the patterns, means for inverting the second slip flask with the drag mold therein, means for supporting the drag mold and removing the second slip flask therefrom, means for disposing the first slip flask with the cope mold therein above the drag mold, means for relatively moving the first slip flask with the cope mold therein and the drag mold generally vertically until the cope mold seats on the drag mold, means for releasing the first slip flask from the cope mold, means for relatively moving the assembled molds and the first slip flask generally vertically until the cope mold is clear of the first slip flask and means mounted on a fixed base for actuating the releasing means.

References Cited

UNITED STATES PATENTS

| | | | |
|---|---|---|---|
| 2,803,860 | 8/1957 | Hines | 164—40 X |
| 2,867,870 | 1/1959 | Hines | 164—29 |
| 3,017,675 | 1/1962 | Young | 164—339 X |
| 3,273,207 | 9/1966 | Taccone | 164—29 X |
| 2,012,478 | 8/1935 | Oyster et al. | |
| 2,680,270 | 6/1954 | Gedris | 164—409 X |

J. SPENCER OVERHOLSER, Primary Examiner

JOHN S. BROWN, Assistant Examiner

UNITED STATES PATENT OFFICE
CERTIFICATE OF CORRECTION

Patent No. 3,516,475             June 23, 1970

William E. Dougherty

It is certified that error appears in the above identified patent and that said Letters Patent are hereby corrected as shown below:

Column 6, line 17, "assembly" should read -- assembling --. Column 7, line 37, "the" (at the beginning of the line) should read -- tle --. Column 8, line 12, "pattern", second occurrence, should read -- platen --. Column 12, line 51, "flasks" should read -- flask --.

Signed and sealed this 29th day of September 1970.

(SEAL)

Attest:

Edward M. Fletcher, Jr.

Attesting Officer

WILLIAM E. SCHUYLER, JR.

Commissioner of Patents